(12) United States Patent
Rodoni

(10) Patent No.: US 10,382,915 B2
(45) Date of Patent: Aug. 13, 2019

(54) CUSTOMER TOOL FOR REMOTE MANAGEMENT OF WASTE SERVICES

(71) Applicant: Rubicon Global Holdings, Inc., Atlanta, GA (US)

(72) Inventor: Philip Rodoni, Decatur, GA (US)

(73) Assignee: Rubicon Global Holdings, LLC, Atlanta, GA (US)

( * ) Notice: Subject to any disclaimer, the term of this patent is extended or adjusted under 35 U.S.C. 154(b) by 0 days.

(21) Appl. No.: 15/168,970

(22) Filed: May 31, 2016

(65) Prior Publication Data

US 2017/0118609 A1 Apr. 27, 2017

Related U.S. Application Data

(60) Provisional application No. 62/299,478, filed on Feb. 24, 2016, provisional application No. 62/246,258, filed on Oct. 26, 2015.

(51) Int. Cl.
| | |
|---|---|
| *H04W 4/20* | (2018.01) |
| *H04M 19/08* | (2006.01) |
| *H04W 4/02* | (2018.01) |
| *B65F 3/00* | (2006.01) |
| *B65F 1/14* | (2006.01) |
| *G06Q 10/08* | (2012.01) |
| *G06Q 50/26* | (2012.01) |
| *G06Q 50/30* | (2012.01) |
| *B65F 1/12* | (2006.01) |

(52) U.S. Cl.
CPC ............... *H04W 4/20* (2013.01); *B65F 1/14* (2013.01); *B65F 3/00* (2013.01); *G06Q 10/083* (2013.01); *G06Q 50/26* (2013.01); *G06Q 50/30* (2013.01); *H04M 19/08* (2013.01); *H04W 4/023* (2013.01); *B65F 1/12* (2013.01); *B65F 2210/128* (2013.01); *B65F 2210/1443* (2013.01); *B65F 2210/168* (2013.01)

(58) Field of Classification Search
CPC ...... B65F 2210/128; B65F 1/12; H04W 4/20; G06Q 10/08; G06Q 50/26; G06Q 50/30
See application file for complete search history.

(56) References Cited

U.S. PATENT DOCUMENTS

| | | | | |
|---|---|---|---|---|
| 6,561,085 B1 * | 5/2003 | Durbin | ................. | B30B 9/3007 100/229 A |
| 7,231,661 B1 * | 6/2007 | Villavicencio | .......... | G06F 21/41 709/225 |
| 7,406,402 B1 * | 7/2008 | Waitkus, Jr. | ........... | G06Q 10/08 702/188 |

(Continued)

FOREIGN PATENT DOCUMENTS

WO    WO 2014/079586 A1    5/2014

OTHER PUBLICATIONS

PCT search report, dated Sep. 19, 2016, 2 pages.
PCT written opinion, dated Sep. 19, 2016, 5 pages.

*Primary Examiner* — Matthew S Gart
*Assistant Examiner* — Stephen S Swartz
(74) *Attorney, Agent, or Firm* — Rock IP, PLLC

(57) ABSTRACT

A tool is disclosed for use in managing waste services. The tool may have an interface configured to receive input from a user indicative of an on-demand service request. The tool may also have a communication device, and a controller in electronic communication with the interface and the communication device. The controller may be configured to transmit a waste management command to a remote service provider via the communication device based on the input.

20 Claims, 4 Drawing Sheets

(56) References Cited

U.S. PATENT DOCUMENTS

| | | | |
|---|---|---|---|
| 2002/0077875 A1* | 6/2002 | Nadir | G06Q 10/08 705/39 |
| 2003/0108171 A1* | 6/2003 | Richardson | H04L 43/06 379/106.01 |
| 2004/0125927 A1* | 7/2004 | Onken | H04L 12/2602 379/106.01 |
| 2004/0199401 A1* | 10/2004 | Wagner | B07C 7/005 235/385 |
| 2005/0131645 A1* | 6/2005 | Panopoulos | B60P 1/5457 701/472 |
| 2005/0171709 A1* | 8/2005 | Nortier | E03B 7/071 702/45 |
| 2005/0275556 A1* | 12/2005 | Brown | B30B 9/3007 340/679 |
| 2007/0268759 A1 | 11/2007 | Sabino et al. | |
| 2008/0089255 A1* | 4/2008 | Graves | H04W 8/22 370/310 |
| 2010/0071572 A1* | 3/2010 | Carroll | B30B 9/3042 100/229 A |
| 2011/0054979 A1* | 3/2011 | Cova | G06Q 10/06 705/7.37 |
| 2012/0274465 A1 | 11/2012 | Graham | |
| 2013/0147613 A1* | 6/2013 | Guo | G08C 19/16 340/12.54 |
| 2015/0294431 A1* | 10/2015 | Fiorucci | G06Q 50/26 705/13 |
| 2015/0307273 A1* | 10/2015 | Lyman | G01G 19/08 705/7.13 |
| 2016/0165019 A1* | 6/2016 | Yang | H04M 1/0256 455/557 |
| 2017/0052052 A1* | 2/2017 | Gwon | B65F 1/14 |

* cited by examiner

CUSTOMER TOOL FOR REMOTE MANAGEMENT OF WASTE SERVICES

RELATED APPLICATIONS

This application is based on and claims priority to U.S. Provisional Application No. 62/246,258 filed on Oct. 26, 2015, the contents of which are expressly incorporated herein by reference. This application is also based on and also claims priority to U.S. Provisional Application No. 62/299,478 filed on Feb. 24, 2016, the contents of which are also expressly incorporated herein by reference.

TECHNICAL FIELD

The present disclosure relates generally to a tool and, more particularly, to a customer tool for remote management of waste services.

BACKGROUND

Commercial and residential waste removal service providers typically dispatch haul vehicles to customer properties according to a predetermined pickup schedule. The pickup schedule is designed to provide services in a manner most efficient for the service provider. For example, under a traditional service model, each customer along an established pickup route within a common geographical area receives waste removal service on the same day each week. On this day, waste containers, often of the same size and configuration on each customer property, are emptied by the service provider, regardless of how full each container is. Customers that subscribe to traditional waste removal services are then billed on a periodic basis (e.g., monthly, quarterly, etc.) for their subscriptions.

Although traditional waste removal services can be useful in some instances, they can also be inflexible. For instance, some customers (e.g., restaurants, businesses, apartment buildings, and residences) may fill their containers before their next regularly scheduled pickups. When this occurs, the containers may spill over, creating an unpleasant and/or unhealthy atmosphere at the customer location. In contrast, other customers that produce less waste may not require service at the scheduled frequency. In this situation, the customer may pay for waste removal services they don't need. Traditional waste removal services may not be able to accommodate these and other varying needs.

The tool of the present disclosure addresses one or more of the problems set forth above and/or other problems in the art.

SUMMARY

In one aspect, the present disclosure is directed to a tool for managing waste services. The tool may include an interface configured to receive input from a user indicative of an on-demand service request. The tool may also include a communication device, and a controller in electronic communication with the interface and the communication device. The controller may be configured to transmit a waste management command to a remote service provider via the communication device based on the input.

In another aspect, the present disclosure is directed to a system for managing waste services. The system may include a receptacle, a vehicle, and a tool configured to receive an on-demand service request from a user in association with the receptacle. The system may also include a central processing unit configured to selectively dispatch the vehicle to service the receptacle based on the on-demand service request.

In yet another aspect, the present disclosure is directed to a method of managing waste services. The method may include receiving an input at a receptacle that is indicative of an on-demand service request associated with the receptacle. The method may also include selectively dispatching a vehicle to service the receptacle based on the on-demand service request.

DETAILED DESCRIPTION

Figure 1:
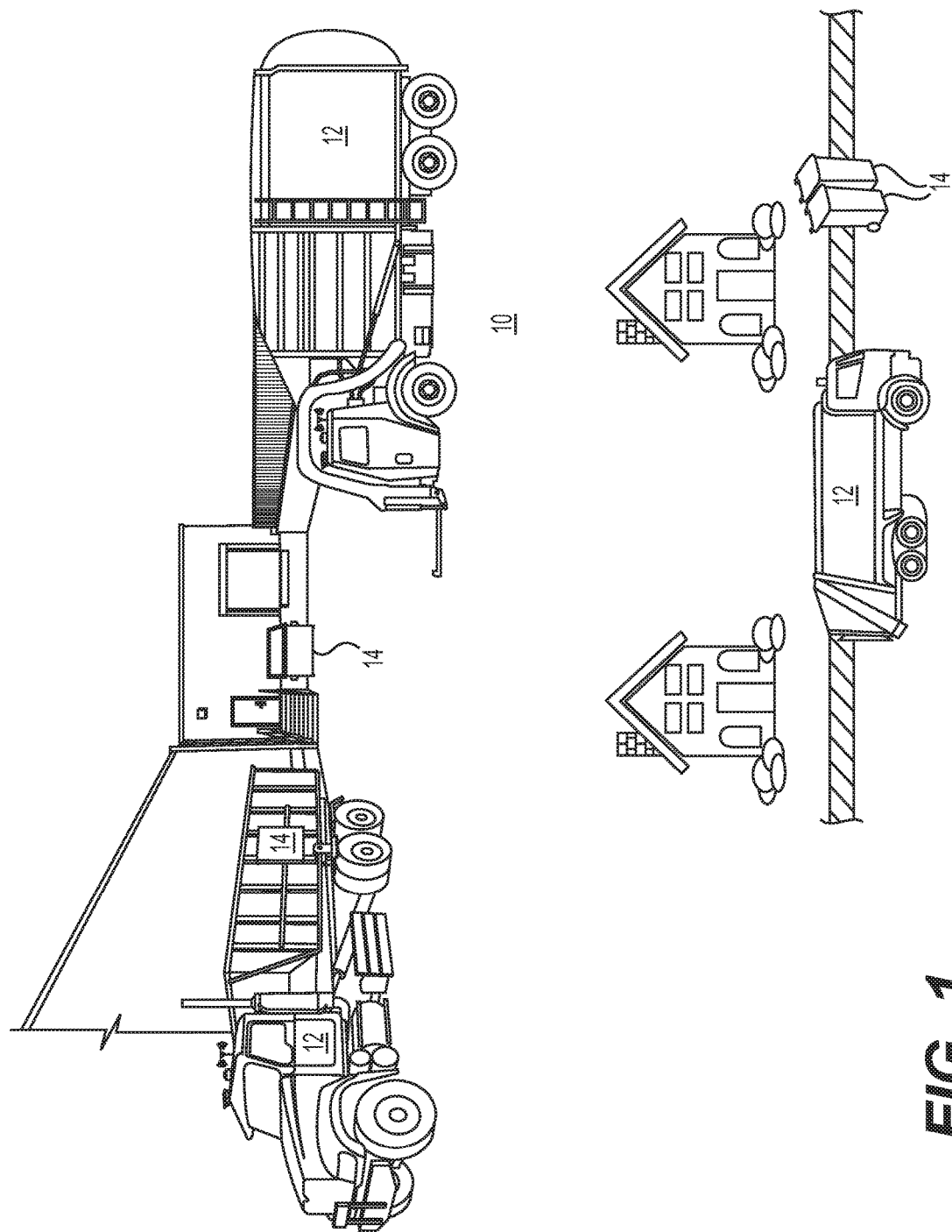
FIG. 1 is a schematic illustration of an exemplary disclosed waste management environment.

FIG. 1 illustrates an exemplary waste management environment ("environment") 10, at which one or more vehicles 12 are performing waste services. The waste services may include any task associated with collection of waste materials (e.g., refuse, recyclables, etc.) at a customer property and/or transportation of the waste materials to a processing center, a recycling center, a landfill, etc. For example, the service may include removal of waste materials from inside of a receptacle 14, the replacement of a receptacle 14, the removal of an empty or full receptacle 14, and/or the placement of a new or additional receptacle 14. The customer property may include a retail store, a factory, a government building, a residential address, or another location having any number of receptacles 14 that require one or more services of vehicle 12.

Vehicles 12 may include, for example, haul trucks and/or trailers that are attachable to the haul trucks, which include or otherwise carry a storage compartment for holding waste materials. As is known in the art, the storage compartment may have a rear, side, and/or top hatch for receiving materials from receptacles 14, and the waste materials may be manually, automatically, or semi-automatically loaded into the storage compartment of a particular vehicle 12 via the corresponding hatch. For example, management personnel may be able to manually lift and tilt receptacles 14 into the storage compartment of a rear-hatch vehicle 12, thereby emptying receptacle 14 of the associated waste. In another example, vehicles 12 may include mechanical, electrical, and/or hydraulic systems configured to automatically grasp, lift, tilt, and thereby empty receptacles 14 into vehicle 12 via a top-hatch. In yet another example, some tasks (e.g., grasping) may be completed manually and other tasks (e.g., lifting and tilting) may be completed with the assistance of the mechanical, electrical, and/or hydraulic systems via a side-hatch of vehicle 12. In a final example, receptacle 14 may simply be loaded (e.g., manually, automatically, or semi-automatically) together with the waste contents onto vehicle 12 and transported away for emptying at another location.

Receptacle 14 may be any type of container for holding waste materials that can emptied into and/or carried by vehicles 12. For example, receptacle 14 may include a dumpster, a wheeled tote, a can, a bin, or another type of container. Each type of receptacle 14 may vary in size and/or configuration. For instance, dumpsters may be available in sizes ranging from 2-40 cubic yards and may be configured for automatic emptying into and/or loading onto vehicle 12. Wheeled totes may include wheels and/or handles that allow them to be manually pulled to a service location and then manually, automatically, or semi-automatically emptied into vehicle 12. Wheeled totes may generally be smaller than dumpsters, having a capacity of up to about 0.5 cubic yards. Cans and bins are typically smaller than wheeled totes, having a capacity of about one-half of the wheeled tote capacity. Cans and bins may typically be manually emptied into vehicle 12.

Figure 2:
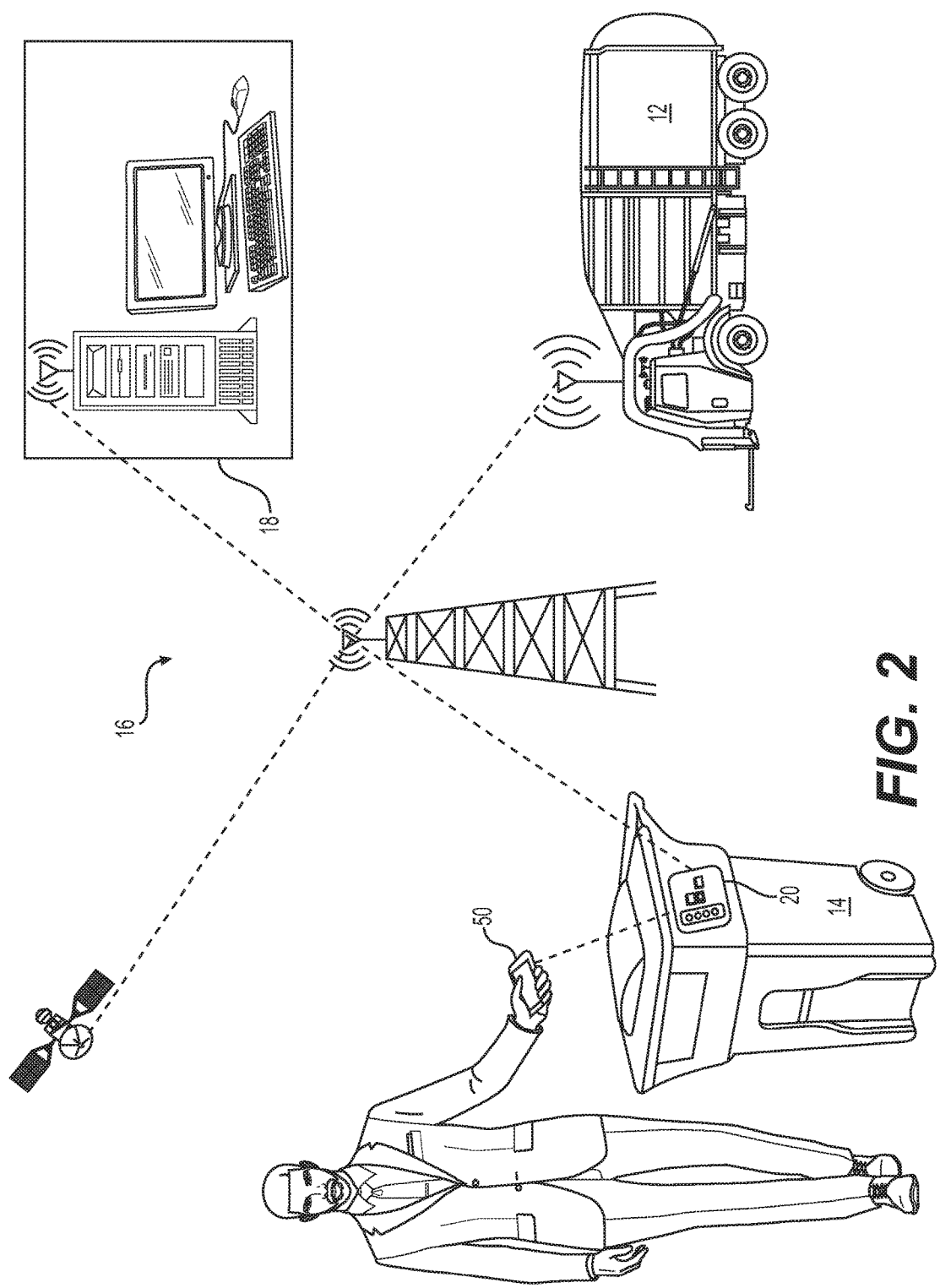
FIG. 2 is a schematic illustration of exemplary disclosed system that may be used to manage the environment of FIG. 1.

FIG. 2 shows an exemplary waste management system ("system") 16 that can be used to coordinate servicing of receptacles 14 by vehicles 12. System 16 may include, in addition to vehicles 12 and receptacles 14, a central processing unit (CPU) 18 and any number of customer tools 20. As will be explained in more detail below, based on customer input and/or other sensory information received via customer tool(s) 20, CPU 18 may be able to selectively dispatch vehicles 12 to perform any number and type of desired service. The components of system 16 may communicate with each other via cellular, telephone, satellite, cable, internet, Bluetooth, Wi-Fi, RFID, or other types of networks.

CPU 18 may include means for monitoring, recording, storing, indexing, processing, communicating, and/or controlling other components of system 16. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Figure 3:
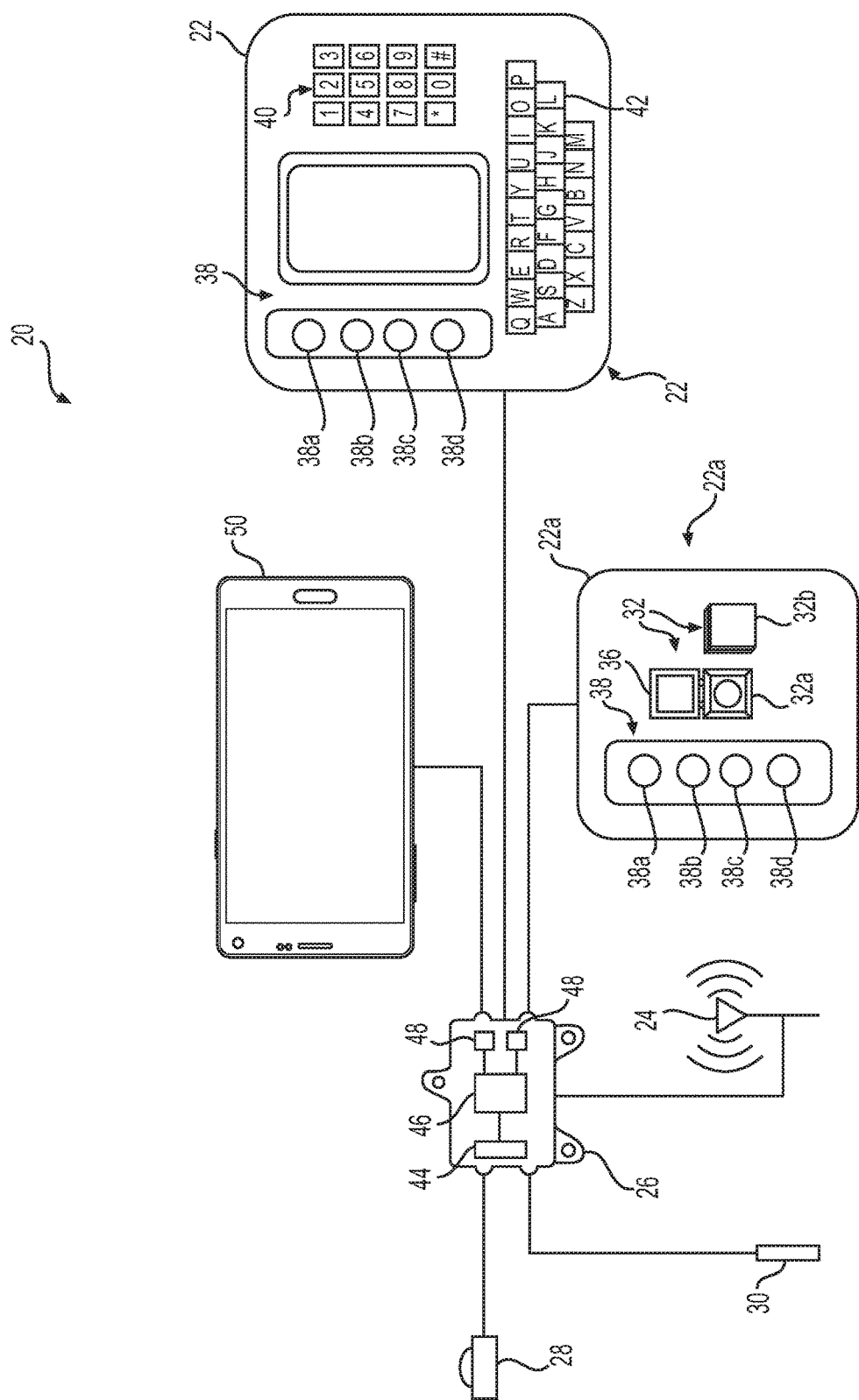
FIG. 3 is a diagrammatic illustration of an exemplary disclosed tool that may be used in conjunction with the system of FIG. 2 to remotely manage waste removal services.

Tool 20 may be integral with, located near, or otherwise connectable to receptacle 14, and configured to facilitate waste service activities associated with receptacle 14. An exemplary tool 20 is shown in FIG. 3. As can be seen in this figure, tool 20 may include, among other things, an interface 22 that receives user input and conveys information to the user, a communication device 24 that transmits digital data between tool 20 and vehicle 12 or CPU 18, and a controller 26 in electronic communication with the other components. In some embodiments, tool 20 may additionally include a locator 28 and/or one or more receptacle-state sensors 30. As will be explained in more detail below, controller 26 may be configured to selectively initiate, monitor, cancel, and/or adjust particular waste services for the user via communication device 24 based on input received from CPU 18, from the user of tool 20 via interface 22, from locator 28, and/or from sensor(s) 30.

Interface 22 may include means for receiving requests from a user in association with desired waste services. For instance, interface 22 may be configured to receive tactile and/or oral input indicative of a request for an on-demand waste pickup, for cancellation of a scheduled or on-demand waste pickup, for a status update associated with an on-demand or scheduled waste pickup, and/or for other things. In one exemplary embodiment, an interface 22a is shown as including one or more input devices 32 that are in electronic communication with controller 26 and configured to receive user inputs and generate signals corresponding to the inputs. For example, input devices 32 may include buttons (e.g., button 32a and button 32b), switches, dials, handles, levers, touch screens, soft keys, and/or other types of devices configured to receive user inputs and generate the corresponding signals. It is contemplated that one or more of input devices 32 may include a protector, such as a cover 36 or other device that is configured to protect input device 32 from harmful elements (i.e., from rain, snow, dust, etc.) and/or from being inadvertently actuated. Cover 36 may be hinged, and pivoted from a closed position at which one or more buttons 32a, 32b are covered, to an open position at which button(s) 32a, 32b are exposed. Other types of protectors may be also or alternatively be used, as desired.

Interface 22 may also include one or more status indicators 38 that are in electronic communication with controller 26 and configured to display or convey information relating to particular waste management activities. Status indicators 38 may be electronic devices configured to generate visual outputs, such as incandescent lights, light emitting diodes (LED), display screens (e.g., LED screens, liquid crystal displays, plasma screens, cathode ray tube displays, etc.), or other devices. In other embodiments, status indicators may also or alternatively include audio devices (e.g., speakers). The information conveyed via status indicators 38 may include, among other things, confirmation that a waste pickup request has been received and/or processed by CPU 18 (referring to FIG. 1), confirmation that a cancellation request has been received and/or processed, and/or a state of receptacle 14 (e.g., open, closed, full, empty, fill level, damaged, etc.)

In the disclosed example, four status indicators 38 are shown, including indicators 38a, 38b, 38c, and 38d. Indicators 38a-38d may be lights configured to generate patterns of illumination that correspond to certain status messages. The patterns may include, for example a varying numbers of flashes for varying durations and at varying frequencies, which correspond with particular status messages to be conveyed. Each of indicators 38a-38d may be of the same or a different color, and each different color may be associated with a different type of information. Each of indicators 38a-38d may also or alternatively be configured to emit multiple different colors of light, if desired. It is understood that each of indicators 38a-38d may convey a different piece of information and/or that any combination of indicators 38a-38d may together convey related information. It is also contemplated that indicators 38a-38d may alternatively embody other devices, such as digital displays, for conveying alphanumeric representations.

In the disclosed example, indicators 38a-38d may have a specific predefined use. In particular, indicator light 38a may be used to indicate that the corresponding receptacle 14 is in an initial or neutral state (e.g., based on an elapsed period of inactivity or current state, as determined by monitoring signals from sensors 30 and/or input devices 42). Indicator light 38b may be used to indicate that a pickup request has been received or cancelled via input devices 42 (e.g., by generating respective light colors or patterns). Indicator light 38c may be used to indicate that the user's request is awaiting assignment or is otherwise being processed (e.g., by generating respective light colors or patterns). Indicator light 38d may be used to indicate that a particular vehicle 12 has been identified and/or dispatched to empty receptacle 14

(e.g., by generating respective light colors or patterns). In some embodiments, indicator light 38d may be caused to generate different light colors or patterns as indications of approximate or expected amounts of time remaining until a dispatched vehicle 12 will arrive to empty receptacle 14. Other or additional indicator lights may also be included to convey other particular pieces of information, such as when receptacle 14 has been emptied, a power supply status, a communication connection status, and/or others.

In another exemplary embodiments, an interface 22b is shown as including a number pad 40, a keyboard 42, and a multifunctional display 44 (e.g., in addition or instead of indicators 38). It is understood, however, that other types of input devices may be used. Number pad 40 may include one or more buttons, each being indicative of a different number or other symbol. Keyboard 42 may include one or more buttons, each being indicative of a different letter or other symbol. In some embodiments, number pad 40 and keyboard 42 may be graphical objects displayed on and used in conjunction with multifunctional deice 44. Multifunctional device 44 may be an electronic device or component configured to function as a display and an input device and may be, for example, a touch screen. In other embodiments, the display and input functionality of multifunctional device 44 may be divided among two separate devices, such as a dedicated display and a dedicated electronic touchpad.

Communication device 24 may include one or more hardware components configured to send and receive signals (e.g., digital data messages) via one or more wired or wireless communication mechanisms, protocols, or standards for communicating with other entities, such as CPU 18, vehicles, 12, other receptacles 14, etc. For example, communications device 24 may be configured to communicate via short- or long-range wireless connections, such as Bluetooth, Wi-Fi, radio frequency identification (RFID), cellular, radio, satellite, or other wireless connections. Communications device 24 may also or alternatively be configured to communicate via wired connections, such as through a telephone, cable, Ethernet, or other communal or dedicated wired connection. In some embodiments, communications device 24 may be configured to communicate by one or more short-range connections and one or more long-range connections in order to facilitate convenient and/or efficient communications with a plurality of different types of mobile or stationary devices. In some embodiments, communications device 24 may facilitate communication between controller 26 and one or more other components of tool 20, such as interface 22, locator 28, and sensors 30. Signals sent by communication device 24 may be indicative of a receptacle ID and a user ID associated with a particular receptacle 14 and user profile, respectively. These signals may contain address information, location information, receptacle size information, and/other information known in the art.

Locator 28 may be configured to receive and/or send signals indicative of a location of itself and, hence, also a location of receptacle 14 (referring to FIG. 2) associated therewith. The location of receptacle 14 may be determined and/or communicated by locator 28 in conjunction with a positioning system, such as a global navigation satellite system (GNSS), e.g., Naystar Global Positioning System (GPS), GLONASS, Galileo, Beidou, etc. Locator 28 may use positioning signals to determine its own position (e.g., by trilateration) with respect to a global or local coordinate system. Locator 28 may be configured to communicate signals indicative of the location of receptacle 14 to controller 26.

As described above, any number of sensors 30 may be associated with receptacle 14 and configured to generate signals indicative of a state (e.g., a performance or condition parameter) of receptacle 14. For example, a hatch sensor (e.g., proximity switch, an optical sensor, an electromagnetic sensor, a rheostat, etc.) 30 may be associated with tool 20 and configured to generate a signal indicative of whether or to what extent a hatch of receptacle 14 is open or closed. In another example, an orientation sensor (e.g., an accelerometer, a gyroscope, etc.) 30 may be associated with tool 20 and configured to generate a signal indicative of a spatial or positional orientation of receptacle 14. In yet another example, a fill level sensor (e.g., an optical sensor, a laser sensor, a weight sensor, an ultrasonic sensor, etc.) may be associated with tool 20 and configured to generate a signal indicative of whether or to what extent receptacle 14 is full or empty. Signals from these and/or other sensor(s) 30 may be communicated to controller 26.

Controller 26 may include computing means for monitoring inputs from other components of tool 20 and generating corresponding output signals based on the inputs. In some embodiments, controller 26 may include a memory 44, a secondary storage device (not shown), a clock (not shown), a single or multiple microprocessors 46, and one or more control modules 48 for accomplishing tasks consistent with the present disclosure. Numerous commercially available microprocessors can be configured to perform the functions of controller 26. Various other known circuits may be associated with controller 26, including signal-conditioning circuitry, communication circuitry, power circuitry, and other appropriate circuitry. Controller 26 may be further communicatively coupled with an external computer system, instead of or in addition to including the computing means, as desired.

Controller 26 and other components or functions of receptacle 14 may be powered by a portable or stationary power source. The portable power sources may include, for example, one or more batteries, one or more solar panels, a movement generator, etc. that are located nearby and attached (e.g., via a cable connector, an induction-charging device, etc.) to, integral with, or otherwise stored within receptacle 14. The stationary power sources may include an established utility grid, an off-grid or alternative energy source (e.g., wind, solar, geothermal, ocean thermal, hydroelectric, heat energy recovery, etc.), a generator, or another source of power.

Memory 44 may be in electronic communication with and accessible by microprocessor(s) 46 and/or control modules 48. Memory 44 may include one or more types of computer-readable medium configured to store computer-readable information, such as data, executable code, programs, applications, and/or other information. Microprocessor(s) 46 may be configured to access information stored in or generated by memory 44 and/or control modules 48, and carry out operations based on the information. Control modules 48 may be internal to (i.e., integral with) or external to microprocessor(s) 46 and may be configured to facilitate one or more tasks of controller 26. For example, control modules 48 may include hardware and/or software configured to be used by or with microprocessor(s) 46 and/or memory 44 to carry out one or more particular input-receiving, information-communicating, and/or computing operations of controller 26.

As will be explained in more detail below, controller 26 may be configured to exchange signals with the other components of tool 20 and off-board entities, such as CPU 18, vehicles 12, etc., and facilitate waste management activities with an associated receptacle 14 based on the received signals. For example, controller 26 may be configured to facilitate waste pickup requests and cancellations, waste pickup status inquiries, anti-tampering functionality, and/or other activities based on the received signals.

In some embodiments, tool 20 may be accessible and/or usable by way of a remote control device 50 (referring to FIG. 2). In particular, controller 26 may be further configured to receive signals from remote control device 50 (e.g., via communication device 24), and to perform analyses and facilitate waste management activities based on these additional signals. For instance, controller 26 may be configured to receive waste pickup requests, cancellation requests, user-credentials, and other access signals and information from remote control device 50. In addition, controller 26 may be configured to generate status indication signals directed to remote control device 50 instead of or in addition to those directed to interface 22 of tool 20.

Remote control device 50 may embody, for example, a portable computing device (e.g., a smartphone, a tablet, a laptop, a dedicated control device, etc.). In the disclosed embodiments, remote control device 50 is a dedicated device configured to emit limited-range signals that can be used to control and/or access tool 20. Some and/or all of the same functionalities described above with regard to interface 22, may be provided by way of remote control device 50. For example, remote control device 50 may include an interface similar to those described above and shown in FIG. 3 (e.g., an interface with buttons, switches, screens, displays, etc.). Alternatively, remote control device 50 may be provided with an app (i.e., a downloadable self-contained software application), which provides for functionalities similar to those of interface 22.

Figure 4:
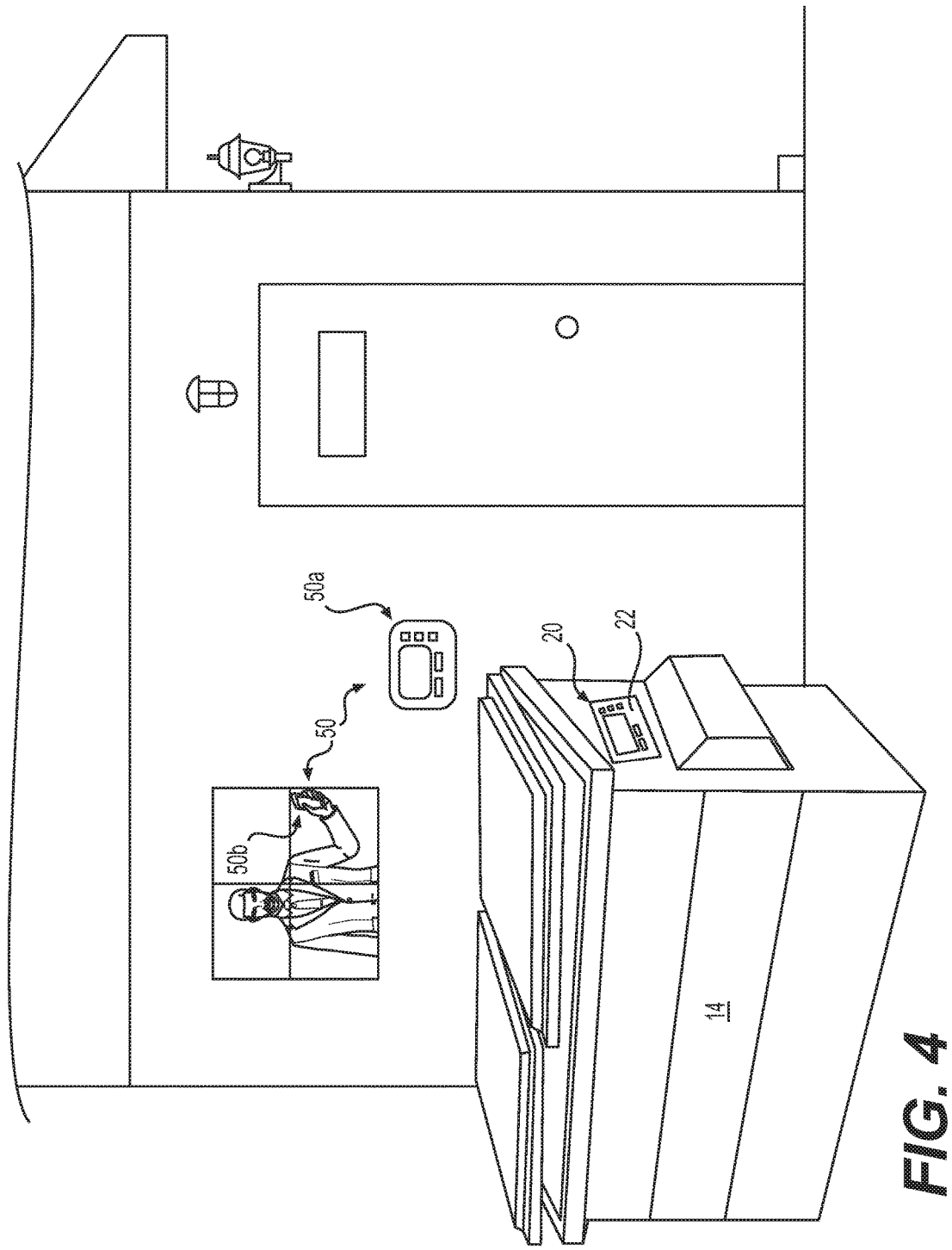
FIG. 4 is a pictorial illustration of an exemplary disclosed remote control device that may be used to access the tool of FIG. 3.

Remote control device 50 may be mobile or stationary, and configured to be operated within close proximity to or at a distance from receptacle 14. For example, with reference to FIG. 4, remote control device 50 may be a stationary device 50*a* located near where receptacle 14 is frequently located and/or serviced (e.g., mounted to an exterior wall of a customer property). In another example, remote control device 50 may be a mobile device 50*b* that can be operated from within the customer property or from another and more-remote location where communication device 24 is still able to establish a desired connection with remote control device 50*b*.

While a distinction between stationary and mobile remote control devices 50 has been made by this description for purposes of convenience and clarity, it is to be understood that stationary remote control device 50*a* and mobile remote control device 50*b* could each be configured for both stationary and mobile uses, if desired. That is, the functionalities of both devices may be combined in a single device. For example, mobile remote control device 50*b* may be connectable to a stationary charging base (not shown), thus becoming stationary remote control device 50*a*. In this configuration, the charging base may include or accommodate charging equipment (e.g., charging cables, charging connectors, batteries, power supply access, grid power access, etc.) to allow remote control device 50 to be charged and/or primarily powered (e.g., instead of relying on an internal power source).

In some instances, remote control device 50 may also be configured to facilitate remote management of other activities related to waste removal, such as account creation, service purchasing, service planning, receptacle management, fleet and route management, statistical analysis, and/or other activities from various customer-, hauler-, and management personnel-points of view. For example, remote control device 50 may be configured to provide users with access to a waste removal management application ("app"), which provides intuitive interface features that may allow for faster, easier, more detailed, and more accurate management of a user's waste management needs than traditional approaches. The waste management application may be configured to identify a waste management activity based on one or more user inputs received via remote control device 50, and to transmit signals indicative of the user inputs in association with a waste management activity to tool 20 (for further transmission to CPU 18 via a communication device 24) or directly to CPU 18, as desired.

INDUSTRIAL APPLICABILITY

The disclosed system may be used in any situation where waste removal services are available. The disclosed system may allow subscribers of the waste removal services to communicate information (e.g., on-demand service requests) quickly, easily, and accurately to providers of the services, and to receive status updates regarding ongoing services. In this way, waste removal services may be carried out with high efficiency and customer satisfaction. Operation of system 16 will now be discussed in detail.

When receptacle 14 becomes filled before a regularly scheduled pickup (or the customer otherwise wishes a particular receptacle 14 to be emptied regardless of fill level or schedule), a waste service customer may request an on-demand pickup by a remote waste service provider. To place the on-demand request, the customer may actuate one or more of input devices 32, 38, 40, and/or 42 of the tool 20 that is associated with the particular receptacle 14. In some cases, tool 20 may be located on or attached to the particular receptacle 14, in which cases the user may approach receptacle 14 to actuate the corresponding input devices.

Controller 26 may be configured to recognize that the pickup request has been made based on one or more characteristics of user inputs received via the input devices (i.e., how a user actuates one or more the input devices). In some embodiments, controller 26 may be configured to recognize that a pickup request has been made when a user merely pressed any one of the input devices.

However, to inhibit a pickup request from being made inadvertently, controller 26 may be configured in some applications to recognize that a pickup request has been made based on a more complex actuation of the input devices. For instance, controller 26 may be configured to track how long a particular input device has been depressed, and to determine that the request has been made only after a predetermined period of time (e.g., about 5 seconds) has elapsed with the input device depressed. In another example, controller 26 may determine that the pickup request has been made based on a pattern or sequences of actuations. For instance, controller 26 may be configured to recognize a predefined pattern or sequence of short actuation times, long actuation times, and/or combinations thereof as the indication that the pickup has been requested. In another example, controller 26 may recognize that the pickup request has been made based on simultaneous actuation of multiple input devices. In still another example, controller 26 may be configured to recognize a numeric code, an alphabetic code, or an alphanumeric code as the indication that the waste pickup request has been made. In yet another example, controller 26 may be configured to display one or more graphical objects on interface 22, which may be engaged by the user to make the waste pickup request.

A user may alternatively use remote control device 50 to request the on-demand waste pickup. In this situation, controller 26 of tool 20 may verify an identification signal generated by remote control device 50 and, based on the verification, selectively grant remote access to the above-described functionalities of interface 22.

In other embodiments, the user may be able to simply move receptacle 14 from a first location to a second location, such as from a predefined storage location to a predefined pickup location. For instance, users may be able to move the full receptacle 14 from a location near their home or place of business, to a curbside or other designated pickup location to request the on-demand waste pickup. In such embodiments, these movements may be tracked via locator 28 and matched to a predefined pattern of movements corresponding to the waste pickup request. To reduce instances of inadvertent pickup requests during movement of receptacles 14, the user may be required in some applications to also possess remote control device 50 and/or to provide a verification input via the input devices of tool 20.

Upon providing input indicative of the request for the on-demand waste pickup, controller 26 may automatically determine the location of the full receptacle 14 (e.g., via locator 28) or retrieve a stored receptacle location from memory and associate the location of receptacle 14 with the user's request. In some situations, controller 26 may further associate the request with information received from sensors 30 in order to provide remote waste service providers with operational or statistical information. Controller 26 may then transmit the user's request (e.g., as a waste management command) and associated information to the remote waste service provider via communication device 24.

Confirmation of a successful request may be indicated through use of one or more status indicators 38 on interface 22 of tool 20. The status of the request may be monitored by the user via status indicators 38 until the request has been fulfilled. If, at any time prior to the request being fulfilled, the user wishes to cancel the request, the user may provide input indicative of a request to cancel the pickup via one or more of the input devices of tool 20 or, in some instance, by returning the previously-set-out receptacle 14 to its original storage location. Once the pickup request is fulfilled, controller 26 may generate a successful pickup confirmation signal via one or more of status indicators 38.

In some embodiments, controller 26 may be configured to regulate the use of tool 20 based on certain anti-tampering protocol. The anti-tampering protocol may include identification characteristics, such as passcode entries, proximity signals, biometric data entries, usage of a key (e.g., key card, key and tumbler, electronic key, etc.), voice recognition, and/or other types of access protocol. In one example, controller 26 may be configured to allow tool 20 to be used only when an ID signal is detected by communication device 24. In this example, the access protocol is provided via remote control device 50 (e.g., via an RFID tag associated with remote control 50) having a registered identification characteristic. The identification characteristic of remote control device 50 may be used by controller 26 as an indication that a known user is present and that received inputs may be associated with actual requests of that user.

Controller 26 may also or alternatively be configured to regulate the use of input devices 42 in response to receiving access signals (e.g., a passcode, a password, a pin number, etc.) from one or more input devices 42 that satisfy an access signal requirement. Upon successful entry of a required access signal(s), controller 26 may be configured to grant access to all or some of the functionality of tool 20. For example, varying levels of access may be granted based on credentials or profile information associated with a user ID or a particular passcode stored in memory 44 or accessible by controller 26. In some embodiments, different levels of access may be granted to, for example, a primary customer, a permissive user, a repair or diagnostic technician, waste management personnel (e.g., technicians, managers, customer support, etc.), and/or other users. In this way, unauthorized users may be prevented from tampering with or utilizing receptacle 14 without proper permission.

Controller 26 may also be configured to determine information based on signals received from sensors 30 and associate that information with requests, commands, or other user inputs received via input devices 42 or automatically generated. For example, controller 26 may receive one or more hatch status signals from sensors 30 and may be configured to determine whether or to what extent a hatch of receptacle 14 is open or closed. Based on the hatch status signals, controller 26 may be configured to determine whether a hatch of receptacle 14 is fully closed, fully open, or partially open (or partially closed). A partially open hatch may be indicative that receptacle 14 is full and/or that its contents are prohibiting the hatch from being closed.

Controller 26 may also be configured to track the hatch status signals and, in conjunction with other information (e.g., an elapsed period of time or a signal from another sensor), determine that receptacle 14 is or might be full. For instance, controller 26 may also receive one or more fill level signals from sensors 30 and may be configured to determine whether or to what extent receptacle 14 is full or empty based on an occupied volume or weight of material inside receptacle 14. Controller 26 may compare fill level determinations with other determinations, such as hatch statuses, to more accurately assess whether receptacle 14 is actually full. For instance, a determination that the filled volume of receptacle 14 is high while the hatch status has been partially open for a threshold period of time may be indicative that receptacle 14 is full despite a very low weight determination (i.e., receptacle 14 may be full of a low-density material). Such determinations and associated information may be stored in memory 44, used to activate corresponding signals via status indicators 38, and transmitted to remote waste service providers in conjunction with requests or commands for waste removal activities.

Controller 26 may also be configured to track the spatial or positional orientation of receptacle 14 based on signals received from sensors 30. In particular, controller 26 may be configured to receive and analyze signals from devices, such as accelerometers and gyroscopes to determine the orientation or a state of movement of receptacle 14 relative to a reference orientation (e.g. with respect to reference positions on one or more axes of movement) or a reference state of movement (e.g. at rest). Reference orientations and reference movements may be set or calibrated by a user via interface 22 or by waste management personnel from on-or off-site locations. Based on the signals from sensors 30, controller 26 may be configured to determine whether and when receptacle 14 is being or has been emptied. Controller 26 may use this information to modify the currently determined fill level of receptacle 14, to generate an empty status signal via status indicators 38, and/or to transmit such information in conjunction with other information (e.g., a most recent fill level or weight measurement) for further processing and analysis. In this way, controller 26 and tool 20 may be configured to provide more accurate and up to date information to system 16, to its users, and to remote waste service providers, which may improve the speed and predictability with which remote waste services can be provided.

The disclosed system may provide users with a management tool that allows users to control many aspects of waste management from a single platform. The disclosed system may collect and transmit detailed and accurate information from customers to remote service providers, thereby allowing for on-demand services to be carried out efficiently and accurately. The disclosed system may also bridge gaps in communication and transparency between customers and remote waste service providers, thereby enhancing customer satisfaction and improving relationship between remote waste service providers and their customers.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A tool for automatically managing waste removal services, comprising:
   a locator associated with a waste receptacle and configured to produce a signal indicative of a location of the waste receptacle; and
   a controller in electronic communication with the locator and a remote service provider,
   wherein the controller is configured to:
      receive input indicative of an on-demand service request on a control panel associated with the waste receptacle;
      verify an identification signal using an anti-tampering protocol associated with the on-demand service request based on the input indicative of the on-demand service request received on the control panel associated with the waste receptacle; and
      transmit the on-demand service request to the remote service provider to service the waste receptacle based on the input indicative of the on-demand service request on the control panel associated with the waste receptacle and verification of the identification signal.

2. The tool of claim 1, wherein the on-demand service request comprises at least one of a command to pick up waste, a cancellation request, and a request for a status update regarding a previous command.

3. The tool of claim 1, wherein the controller is further configured to generate the on-demand service request based on the verification protocol comprising a verification input received from the interface associated with the waste receptacle.

4. The tool of claim 1, further comprising a status indicator, wherein the controller is configured to selectively activate the status indicator to confirm receipt of a request for waste pickup, to confirm a cancellation request, or to provide a status update of a pending waste pickup.

5. The tool of claim 3, further comprising a control device configured to transmit signals to the controller from a location remote from the controller that are indicative of the verification input.

6. The tool of claim 5, further comprising a charging base, wherein:
   the interface is included in the control device; and
   the control device is removably connectable to the charging base.

7. The tool of claim 1, wherein the controller is further configured to associate the location of the waste receptacle with the on-demand service request.

8. The tool of claim 1, further comprising a sensor configured to generate signals indicative of a receptacle parameter, wherein the controller is configured to associate the receptacle parameter with the on-demand service request.

9. A waste management system, comprising:
   a waste receptacle;
   a service vehicle; and
   a central processing unit configured to:
      receive input indicative of an on-demand service request on a control panel associated with the waste receptacle;
      verify an identification signal using an anti-tampering protocol associated with the on-demand service request based on the input indicative of the on-demand service request received on the control panel associated with the waste receptacle; and
      automatically and selectively send the on-demand service request to dispatch the service vehicle to perform waste removal services for the waste receptacle based on the input indicative of the on-demand service request on the control panel associated with the waste receptacle and verification of the identification signal.

10. The waste management system of claim 9, wherein the central processing unit is located remote from the waste receptacle.

11. The waste management system of claim 9, wherein the on-demand request is associated with a request to pick up waste from the waste receptacle, to cancel a previous request for waste pickup, or to provide a status update of a pending waste pickup request.

12. The waste management system of claim 9, further comprising a status indicator configured to activate in association with the on-demand service request based on information received from the central processing unit.

13. The waste management system of claim 9, further comprising a remote control device configured to provide an interface for receiving input from a user.

14. The waste management system of claim 9, further comprising a sensor configured to generate signals indicative of parameters of the waste receptacle, wherein the central processing unit is configured to selectively dispatch the service vehicle based further on the parameters of the waste receptacle.

15. A method of automatically managing waste services, comprising:
   receive input indicative of an on-demand service request on a control panel associated with a waste receptacle;
   verify an identification signal using an anti-tampering protocol associated with the on-demand service request based on the input indicative of the on-demand service request received on the control panel associated with the waste receptacle;
   sending the on-demand service signal to a remote service provider to service the receptacle based on the input indicative of the on-demand service request on the control panel associated with the waste receptacle and verification of the identification signal; and
   selectively dispatching a vehicle to service the waste receptacle.

16. The method of claim 15, wherein the on-demand service signal is associated with a request to pick up waste from the waste receptacle, to cancel a previous request for waste pickup, or to provide a status update of a pending waste pickup request.

17. The method of claim 15, further comprising:
providing a visual status indication regarding completion of the on-demand service signal; and
sensing a parameter of the waste receptacle;
wherein selectively dispatching the vehicle includes selectively dispatching the vehicle based further on the parameter.

18. The tool of claim 1, wherein the on-demand service request causes a service vehicle to be dispatched to the location of the waste receptacle.

19. The waste management system of claim 9, wherein the on-demand request is sent when the monitored movement matches one or more stored movement patterns and in response to verifying an identification signal.

20. The method of claim 15, wherein the on-demand service signal is sent based on comparison of the monitored location of the waste receptacle with the one or more stored movement patterns and verifying an identification signal.

* * * * *